United States Patent [19]
Corbett et al.

[11] 3,966,142
[45] June 29, 1976

[54] VERTICAL TAKEOFF AND LANDING AIRCRAFT

[75] Inventors: Marshall J. Corbett, Centerport; Robert W. Kress, Lloyd Harbor, both of N.Y.

[73] Assignee: Grumman Aerospace Corporation, Bethpage, N.Y.

[22] Filed: Mar. 6, 1975

[21] Appl. No.: 556,095

[52] U.S. Cl. .............................. 244/12 A; 244/120
[51] Int. Cl.² ........................................... B64C 1/30
[58] Field of Search ............ 244/120, 7 A, 7 B, 7 C, 244/7 R, 6, 12 A, 12 R, 13, 15, 87, 91

[56] References Cited
UNITED STATES PATENTS

| | | | |
|---|---|---|---|
| 3,002,719 | 10/1961 | Weiland et al. | 244/118 R |
| 3,165,280 | 1/1965 | Shaa-Tang Lee | 244/12 A |

*Primary Examiner*—Trygve M. Blix
*Assistant Examiner*—Galen L. Barefoot

[57] ABSTRACT

A Vertical Takeoff and Landing (VTOL) aircraft that has a small stowage envelope made possible by articulation of the aircraft empennage and fuselage, the aircraft having propulsion units capable of providing in all attitudes of the empennage with respect to said fuselage engine wash of the empennage thereby insuring aircraft control without additional reaction stabilizing units.

21 Claims, 10 Drawing Figures

VERTICAL TAKEOFF AND LANDING AIRCRAFT

FIELD OF THE INVENTION

This invention relates to fixed wing aircraft and has particular reference to vertical takeoff and landing aircraft of the type known generally as "tail-sitters".

SUMMARY OF THE PRESENT INVENTION

As used in this application, the term "tail-sitter" denotes a type of aircraft in which the tail structure of the aircraft is vertically disposed during takeoff and landing operations. The aircraft does not necessarily rest with its tail section on the launching platform before takeoff, although in some prior "tail-sitters" this does happen to be the case.

It has been proposed to use tail-sitter aircraft on sea going vessels of various classes and sizes in a convoy to provide a measure of airborne defence when aircraft carriers are not nearby. Even if carriers were operating in the general vicinity of the other vessels the tail-sitters could augment the complement of the carriers, if necessary. Thus, the Vertical Takeoff and Landing aircraft for use on sea going vessels would provide a logical alternative to building and equipping more and larger aircraft carriers for the purpose of getting better mid-ocean airborne defense for sea-going convoys.

In prior VTOL tail sitters the wing surface and the tail are maintained in the vertical plane during takeoff, the entire craft pitching over to the flight mode as the aircraft rises. The cockpit may be swivelled to keep the crew in a normal flight attitude during those maneuvers.

The VTOL aircraft of this invention is a winged vehicle powered by jet or fan jet engines in which the fuselage has articulated sections so that during normal flight the tail section is in line with the forward section and during takeoff and landing the wings and cockpit of the forward section remain in the normal flight attitude i.e., substantially horizontal, even though the tail section is vertically disposed. Vectored flight propulsion is achieved by rotating the thrust axis of the engines so as to provide the vertical thrust necessary for takeoff and landing and longitudinal thrust for normal flight. In all flight modes from takeoff to normal flight, the engine efflux is directed over the tail structure, and the aerodynamic control surfaces thereon that provide the attitude and flight controls without the need for auxiliary apparatus. In a preferred embodiment the tail and the engine rotate in concert, downward through a tilt angle of up to approximately 110 degrees relative to the longitudinal axis of the aircraft.

In the preferred embodiment aforementioned, the fuselage of the aircraft is formed in two major sections joined through a pivot or hinge parallel to the vehicle's pitch axis and near the engine pod attachment points. The forward fuselage section of the vehicle contains the wings and pilot/crew stations and remains in a conventional flight attitude at all times. For takeoff and landing, the aft fuselage section which contains the tail and engine is tilted downward as a unit, relative to the forward fuselage section, thereby orienting the engines so as to provide vertical thrust. The rudder and elevon surfaces, being attached to the rear fuselage section, are kept immersed in the engine efflux to thereby provide for aircraft control at all times as will be described later.

Tilting the rear section while maintaining the forward section horizontal provides a high degree of pilot/crew forward visibility and perhaps more important, maintains the wing at the desired angle of attack for maximum efficiency. The wing is thus prevented from stalling during transition between vertical and horizontal flight which may occur in a conventional tail sitter or tilt wing aircraft. An additional advantage of this arrangement is that the effects of horizontal wind gusts when hovering near the surface are reduced by maintaining the wing parallel to the surface with only the smaller rear section being in the directions of the gusts.

For takeoff, the aircraft is supported by its landing gear resting on a platform which is structured to receive the aircraft's landing gear and support same horizontally and vertically. The aircraft is held by its landing gear until its engines can provide the force necessary for liftoff, at which time the aircraft is released. It proceeds away from the platform in the vertical flight mode, then transitions to the horizontal flight mode as the tail section is drawn up to reduce the break angle in the fuselage climbing all the time, as demanded, and finally proceeds away from the launching site to fulfill its mission as a normally flight configured aircraft.

In landing the above process is reversed. After landing, and after the aircraft is securely attached to the platform, the engines of the aircraft are shutdown.

The design of the articulated VTOL aircraft is such that the aircraft's tail control surfaces always remain immersed in the engine efflux whether the aircraft is being operated in the VTOL mode or in a level flight mode. The control surfaces therefore remain effective as long as an engine continues to provide an air flow over it, eliminating the requirement for the aircraft to maintain forward velocity or to be burdened with a reaction control system for control system effectiveness.

It will be seen that the articulated aircraft is especially suited for deployment from underground and undersea storage, allowing the aircraft to be deployed from submarines. The limited hatch size on present submarines has precluded the possibility of storing conventional aircraft inside the vessel in that the fuselage length of todays aircraft precludes entry of the aircraft through the hatch. The aircraft fuselage of this invention, however, folds to a convenient size which can be passed through the hatch when the wing tips are folded over the wings as is conventional in naval airplanes.

As with reaction propelled VTOL aircraft such as is known today there is also a need to eliminate the effect of the engine wash or efflux on foreign particles from being disturbed in the ground effect attitude such that they are ingested by the propulsion means. As will be familiar with those skilled in the art much effort and expense has been expended in developing means to prevent foreign particle ingestion in propulsion means. Needless to say none could be more effective than placing the propulsion means such that it is above the plane of ground effect disturbance of same. In this invention, for the first time there is combined the advantages of a tail-sitter VTOL and the reaction propulsion lift VTOL in reducing foreign particle damage and starvation of the propulsion means.

It is a purpose of the invention to provide a VTOL aircraft for use primarily on naval and merchant vessels which is also capable of land base operation.

It is another purpose to produce a tail-sitter Vertical Takeoff and Landing aircraft having reduced probability of stalling during transition from liftoff to level flight.

It is another purpose of the invention to produce a Vertical Takeoff and Landing aircraft of the tail-sitter type in which the wings are always maintained in the normal flight mode.

Yet a further purpose of the invention is to produce an aircraft which can fit through a relatively small opening for storage under cover.

It is still another purpose of the invention to produce a Vertical Takeoff and Landing aircraft which does not require auxiliary reaction control systems for maneuvering during takeoff or landing.

A still further object of this invention is to provide a reaction lift VTOL tail sitter aircraft whose propulsion means is protected from foreign particle ingestion.

These, and other purpose and advantages of our invention will become clearer during the description to follow.

BRIEF DESCRIPTION OF THE DRAWINGS

For a more complete understanding of the invention reference may be had to the accompanying drawings, in which.

DESCRIPTION OF THE PREFERRED EMBODIMENTS

Figure 3:
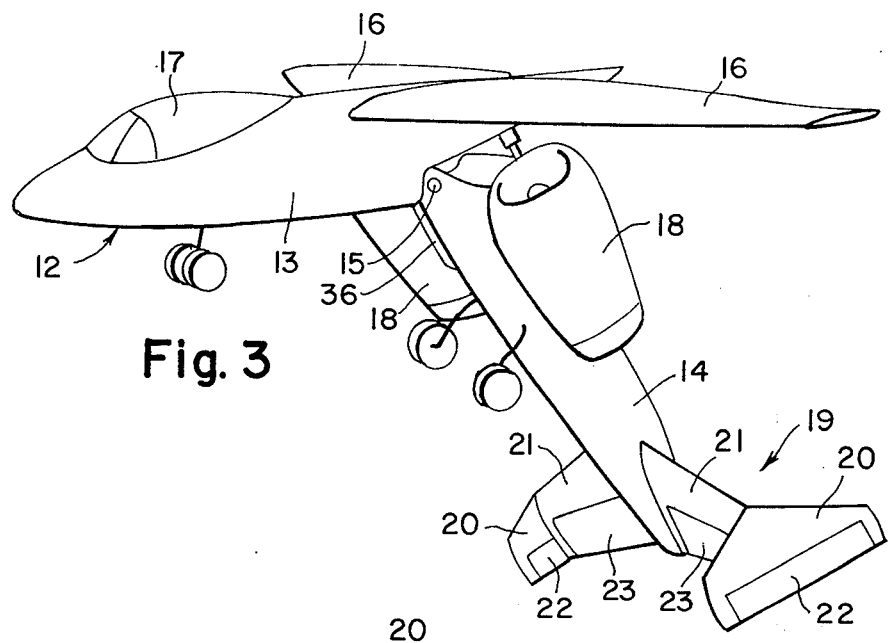
FIG. 3 is a pictorial view of the aircraft in a transition mode.
Figure 1C:
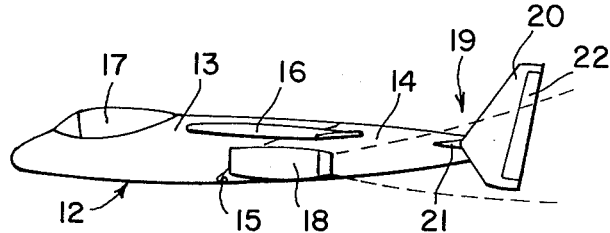
FIG. 1c shows the aircraft of FIG. 1a in the closed or normal flight mode.
Figure 1B:
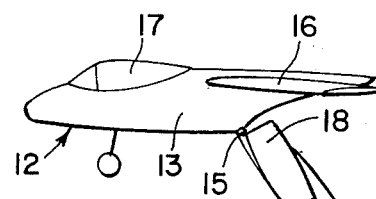
FIG. 1b shows the aircraft of FIG. 1a in a transition mode.
Figure 2:
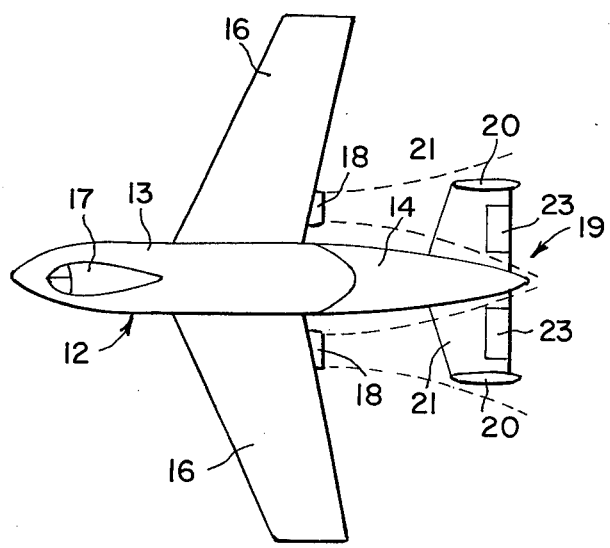
FIG. 2 is a plan view of the aircraft of FIG. 1c.
Figure 1A:
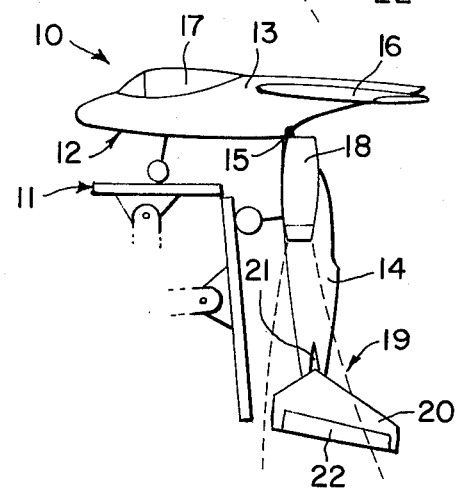
FIG. 1a is a side view of the preferred embodiment in the open or takeoff mode.

With reference now to FIGS. 1a, 1b and 1c of the drawings there are shown three modes, or configurations of the preferred embodiment of the aircraft in various stages of flight. In FIG. 1a the aircraft 10 is resting on a launching platform 11 in a takeoff or landing mode in which the fuselage is fully open; in FIG. 1b, the aircraft 10 is in a transition mode wherein the fuselage is partly open and in FIG. 1c the aircraft 10 is in the normal flight mode wherein the fuselage is completely closed. As seen in FIGS. 1, 2 and 3, paying particular attention to FIG. 3, which is a pictorial representation of the aircraft 10 in the transition mode, the fuselage 12 of aircraft 10 includes a forward section 13 and a rear or tail section 14 which are joined at a hinge connection 15. The connection 15 permits relative rotation of the rear section 14 with respect to the forward section 13 about a pitch axis aircraft 10.

The forward section 13 carries the fixed wings 16 and cockpit 17, while the rear section 14 carries the propulsion means 18 and empennage 19. The propulsion means 18 are preferably podded fan jet engines, and are supported by faired mounting means 36 from the fuselage section 14 so as to create an efflux which impinges on and washes the empennage 19 in all configuration modes of the aircraft 10. The efflux, in impinging on the fins 20,20 stabilizers 21,21 rudder surfaces 22,22 and elevon surfaces 23,23 provides the forces necessary to stabilize and maneuver the aircraft even when the aircraft is not in the normal flight mode, FIG. 1c.

As will be readily understood by one skilled in the art, control of the airplane in the conventional flight mode shown by FIG. 1c will be by rudder means 22 for yaw control, elevons 23 in pitch when symmetrically operated and elevons 23 in roll when differentially operated. In the VTOL mode, as will also be readily understood by one skilled in the art, it will become necessary, as the tail section is displaced downwardly, to change the function of these controls as by means mechanical or electrical to gradually wash out the connection of the rudder control to the rudder means and the differential elevon control to the elevators while gradually connecting said rudder control to the elevators and such differential elevon control to the rudder means until the tail section is in its downwardmost attitude. Therefore, in the takeoff configuration, FIG. 1a the rudder controls motion in roll and the differentially displaced elevons control motion in yaw. In the transition mode, FIG. 1b, the rudder and differential elevon displacements will each produce motions in both roll and yaw, the effect of each being trigonometrically related to the tilt angle $\theta$, i.e. the angle between the forward and rear section 13,14. The effect of symmetrical elevon displacement is always a motion in pitch and does not change with tilt angle $\theta$. Accordingly, by directing the engine efflux over the control surfaces 20 through 23 the aircraft can be maneuvered in all configurations without accessory equipment. The need for reaction control units or other maneuvering aids during vertical flight is eliminated in the present invention.

In the embodiment of FIGS. 1-3 the engines 18 and empennage 19 move as a unit with the rear section 14 to maintain the engine discharge impinging on the empennage. The engine 18 is usually fixed to the fuselage but it may be mounted thereon, as by a rotatable shaft or other actuable means known in the art, for limited rotation about a transverse axis to redirect the reaction vector and/or the engine efflux over the empennage, as required. Such rotation would allow some difference in the thrust axis with regard to that of the tail section to compensate for wind gusts tending to deflect the engine discharge from the empennage under high surface wind conditions. Thus, in FIG. 1a a wind from the left would deflect the discharge away from the empennage if the axis of engine 18 were pointed directly aft. By canting the exhaust axis of engine 18 into the wind, the discharge would be redirected over the empennage. Such canting of the axis of the engine could be automatically controlled by known devices capable of sensing wind gusts and/or velocity and providing a control signal to the means controlling rotation of the engines 18. In addition, such devices may also be adapted to account for cross-winds as is well known in the art.

Figure 4C:
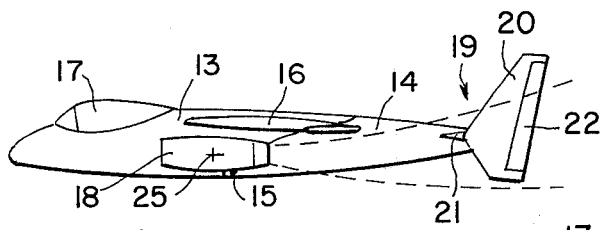
FIG. 4c shows the aircraft of FIG. 4a in the closed or flight mode.
Figure 4B:
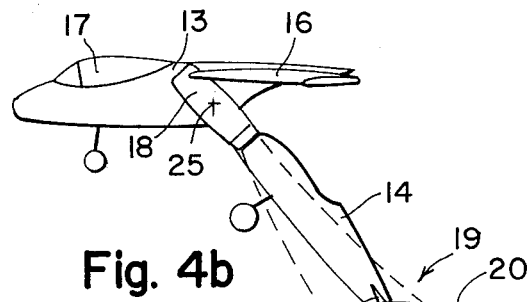
FIG. 4b shows the aircraft of FIG. 4a in a transition mode.
Figure 4A:
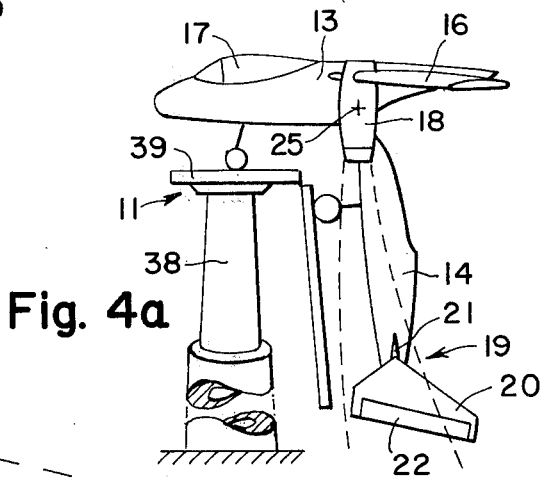
FIG. 4a shows a side view of another embodiment of the aircraft in the open or takeoff mode on an elevatable platform.

It should be noted that the engine 18 may be mounted on the forward section 13 and adapted to rotate in concert with the rear section 14 so as to keep the efflux impinging on the empennage 19. Thus, in FIGS. 4a, 4b, 4c, corresponding to the takeoff or landing mode, transition mode and normal flight mode respectively of a second embodiment of the invention the engine 18 is carried on the forward section 13. The engine 18 is mounted for rotation about a transverse axis 25, such rotation being controlled by means not shown so as to maintain the efflux of engine 18 directed against the empennage 19 as the rear section 14 rotates about the transverse axis of hinge 15, not visible in FIGS. 4a and 4b. Also with reference to FIG. 4a there is shown an actuator 38 connected to a horizontal section 39 of platform 11 to raise and lower the platform from an underground or undersea storage means, such as a silo site as heretofore has been used for missiles or a submarine. It will be readily appreciated that the aircraft 10 will in such deployments include also means for folding a portion of wings 16 (as shown by the dotted line in FIG. 5) to complete the profile reduction of the airplane for such storage. Aside from the obvious advantage of enabling aircraft deployment of greater magnitude, this feature of the invention will provide greater undetectable visibility and protection in such deployment.

Figure 5:
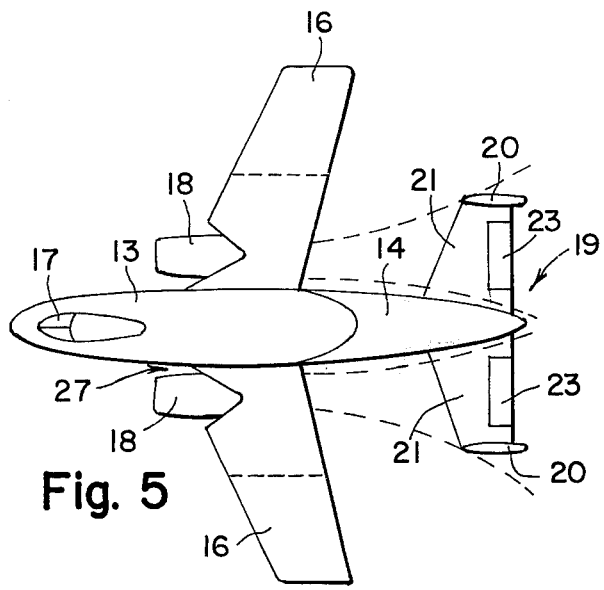
FIG. 5 is a plan view of an aircraft of FIG. 4c.

FIG. 5, a plan view of the configuration shown in FIG. 4, illustrates how the leading edges of the wings 16 may be sculptured to accommodate the engine 18, if necessary, in its vertical operating mode. Upon rotation, a portion of the engine 18 may extend into the plane of the wing 16, depending upon the geometries involved and the position of the rotational axis 25. In order to eliminate interference between the engine 18 and the wind 16 a notch 27 is provided in the wing.

It should be understood that the mounting for the engine 18, if desired, could be more than a simple pivot, providing for translational as well as rotational motion of the engine 18 so that the engine 18 could be maintained below the wing level at all times, thereby making the notch 27 unnecessary. Furthermore, the engine 18 may be suspended from the wing 16 rather than being attached to the fuselage 13 in certain designs. If suspended from the wings the pivot axis of the engines 18 would be operatively connected to that of the front section 13 and tail section 14 so as to be movable therewith.

Figure 6:
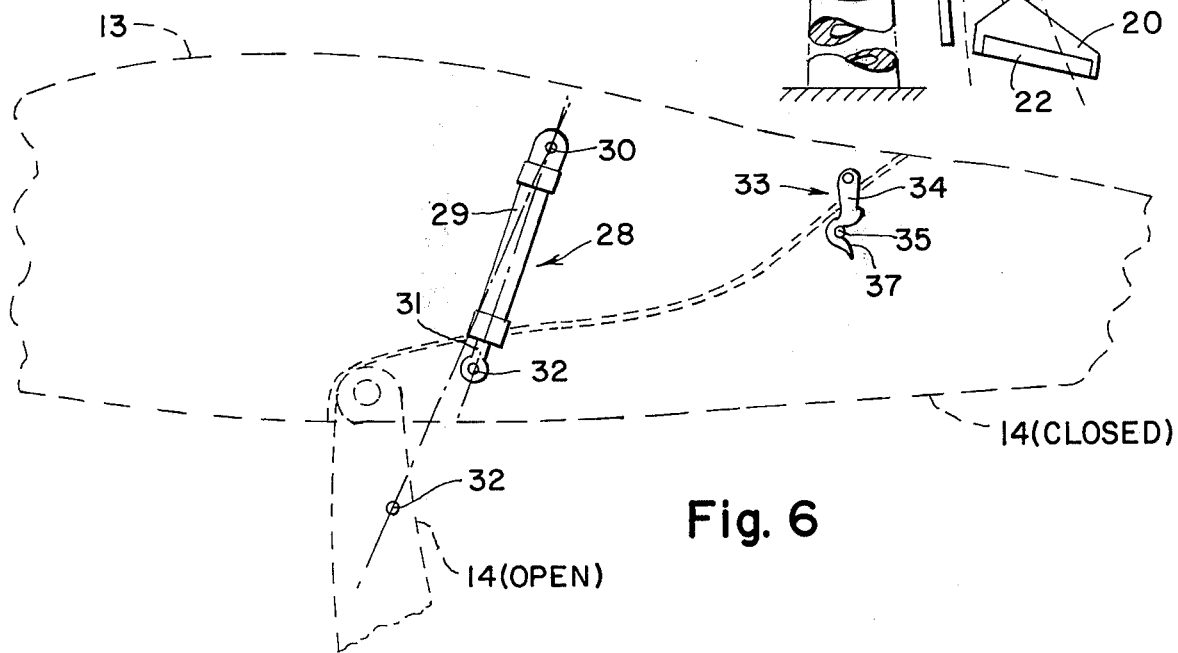
FIG. 6 is a detail of one embodiment of the fuselage opening and closing device.

A mechanism for opening or closing the fuselage is provided. As shown by FIG. 6, it is a hydraulically controlled telescoping device 28, pivoted on both the forward section 13 and rear section 14. The closed end of the hydraulic cylinder 29 is attached to a pivot 30 in the forward section 13 and the actuator rod 31 is connected to a pivot 32 in the rear section 14. With device 28 closed the rear section 14 is drawn into the normal flight configuration and with device 28 open, the rear section 14 is driven into the takeoff or landing configuration. Also shown in FIG. 6, is an uplock latching arrangement 33 to hold the rear section 14 securely against forward section 13 while the aircraft is in the closed configuration. The latch 33 includes a hook 34 pivoted on section 13 which engages a pin 35 on section 14. Such a latch has a cam surface 37 which will permit unlatch and relatch automatically. This type of latch could be changed to a powered latch by one skilled in the art.

The fuselage and empennage, being continuously exposed to the exhaust gases of the engine, must be capable of withstanding the temperatures and corrosive atmospheres to which they are exposed. For this reason, a fan jet engine with relatively cool exhaust, may be found advantageous in easing the design problems associated with thermal protection of the aircraft surfaces. However, with the recent technological advance in materials higher density of turbojet engine exhaust may be used to enhance the aerodynamics of the control surfaces.

The operation of the aircraft is briefly as follows:

The aircraft is transferred from its storage area to the launching platform and secured to the platform in the tail down launch configuration, with the engines oriented so as to provide vertical thrust. The engines 18 are activated and when the thrust reaches a lift-off level the aircraft 10 is released from the platform 11 and the aircraft begins to rise vertically.

Upon reaching some predetermined height, the actuator 28 is activated and the rear section 14 of the aircraft is drawn towards the forward section 13. At the same time the engine rotates so that the vertical component of engine thrust is reduced while the horizontal component is increased causing the aircraft to attain forward motion. Eventually the forward speed is such that the wings 16 provide the lift required to maintain flight. When the fuselage is entirely closed and locked by latches 33 the aircraft is operable as a conventional aircraft and may conventionally land and takeoff.

During the maneuver from takeoff to flight, as a VTOL aircraft the efflux of the engines 18 is directed against and impinge on the aerodynamic control surfaces 22 and 23 of the empennage. Adjustments of the aircraft's attitude from the moment of launch throughout flight can be made by deflecting the rudder 22 and elevon 23 as required by the pilot with or without means to control mix between input and output signals or control forces.

After completion of the mission, the aircraft returns to its mother ship and, as it approaches for a VTOL landing the engines 18 are rotated to change engine thrust from forward to vertical and at the same time the actuator 28 is operated to drop the rear section of the fuselage to keep the tail surfaces in the engines efflux. Thus, the aircraft slows its forward progress and reaches a hovering condition near the landing platform.

The engine thrust is diminished to permit the aircraft to descend, and the aircraft is maneuvered to the landing platform under control of rudders 22 and elevons 23 and, when needed, by adjusting the thrust vector, through rotation of the engine. During such time the inlet of the propulsive means 18 is well above the turbulent ground effect created by the engine wash, whose effect is diminished over that of present day reaction thrust VTOL aircraft in that the engine efflux in washing the empennage a predetermined distance therebehind is split thereby into several lesser turbulent flows to provide a less concentrated surface disturbance and yet a wider base for reaction lift. After the forward wheel touches the landing platform the aircraft can be captured and secured to it by a mechanism (not shown) and the engines are turned off. It will be seen that the aircraft is supported by nose landing gear on the forward section of the fuselage and main landing gear on the tail section of the fuselage, which are respectively in contact with the horizontal and vertical sections of the platform 11.

It should be noted here that during takeoff and landing operations, i.e. while the aircraft is configured with the tail-down, the engine air intake is considerably higher above ground than is the case with conventional VTOL craft. As a consequence, at least three common problems found in today's VTOL aircraft are absent in the present invention. These are: (1) foreign particles dislodged by ground wash of the engine will not reach the air intake, thereby eliminating engine damage from that cause (2) air intake temperatures will not be increased significantly by the engine exhaust so that no thrust loss will be experienced due to hot air ingestion, and (3) lift loss due to the "sucking" effect generally created by the partial vacuum under the aircraft resulting from escaping engine exhaust will not be present.

In addition, tests have proven, that in the VTOL configurations, shown, another important feature related to pilot safety is secured, namely attitude maintenance in single engine failed conditions. More specifically, in that the engine efflux of one engine is always washing as least one side of the empennage, the control surfaces thereon are effective in maintaining the attitude of the aircraft so as to keep the cockpit upright. In several known prior art VTOL designs this has not been the case and the aircraft has been upset, whereby pilot escape and survival was precluded. This would not be the case in single engine control of this invention, as the washing of at least a part of the control surfaces would permit pilot control of the airplane attitude.

The description of the preferred embodiment and variations thereof have served to illustrate the basic concept only and should not be considered as limiting the invention to those embodiments. For example, the engine itself need not be rotated for the purposes of changing the engine thrust from horizontal to vertical, since such redirection is commonly accomplished through the use of deflecting vanes. Also, although the figures have shown an aircraft with twin engines, one on either side of the fuselage to produce the thrust and airflow over the tail, the invention may equally well be applied to single engine aircraft. For example, the empennage may be supported on twin booms straddling the engine so that the engine efflux is directed between the booms over the empennage.

Having described our invention with reference to several embodiments thereof, it should be understood that the invention is not defined by the precise details set forth in the illustrations but rather it is defined by the scope of the appended claims.

What we claim is:

1. An aircraft having a fuselage, wings, empennage and propulsion means,
   said wings being attached to said fuselage,
   said propulsion means producing a thrust,
   means for rotating said thrust with respect to said wings and said fuselage,
   said empennage being rotatable as a unit with respect to said fuselage,
   wherein said empennage rotates in concert with the rotation of said thrust whereby the efflux of said propulsion means is directed at and impinges on said empennage.

2. The aircraft as described in claim 1 in which said means for rotating said thrust includes means for rotating said propulsion means.

3. The aircraft as described in claim 1 wherein said empennage is rotatable about an axis remote from said empennage.

4. The aircraft as described in claim 1 wherein said thrust and said empennage are rotated about the same axis.

5. An aircraft having a fuselage, wings, empennage and propulsion means,
   said wings being attached to said fuselage,
   said empennage being rotatably attached to said fuselage,
   said propulsion means being productive of a thrust and including means for rotating the thrust relative to said wings and said fuselage, and
   menas for rotating said empennage with respect to said fuselage whereby said empennage is washed by the efflux created by said propulsion means regardless of the direction of said thrust relative to the wings.

6. The aircraft as described in claim 5 in which said means for rotating said thrust includes means for rotating said propulsion means.

7. The aircraft is described in claim 5 wherein said thrust and said empennage are rotatable about separate axes.

8. The aircraft as described in claim 5 wherein said empennage is rotatable about an axis remote from said empennage.

9. The aircraft as described in claim 5 wherein said thrust and said empennage are rotatable about the same axis.

10. The aircraft as described in claim 7 wherein said empennage rotates about its said axis in concert with the rotation of said thrust whereby the efflux of said propulsion means is directed at and impinges on said empennage.

11. The aircraft as described in claim 9 wherein said empennage rotates about its said axis in concert with the rotation of said thrust whereby the efflux of said propulsion means is directed at and impinges on said empennage.

12. The aircraft as described in claim 5 wherein said fuselage is divided into a forward section and a rear section, and wherein said wings are attached to said forward section and said empennage is attached to said rear section, said rear section being hinged to said forward fuselage section for rotation.

13. The aircraft as described in claim 12 including means for mounting siad propulsion means on said rear fuselage section.

14. The aircraft as described in claim 13 wherein said propulsion mounting means provides for limited rotation of the thrust of said propulsion means with respect to said rear section.

15. The aircraft as described in claim 12 including means for mounting said propulsion means on the forward fuselage section.

16. The aircraft as described in claim 12 including means for mounting said propulsion means on said wings.

17. A vertical takeoff and landing (VTOL) aircraft having wings, fuselage, empennage and propulsion means, means for rotating the thrust delivered by said propulsion means,
    said empennage and said thrust being rotatable with respect to said wings about first and second transverse axis respectively between predetermined limits of rotation,
    said aircraft being in a VTOL takeoff/landing configuration at one rotational limit of said empennage and thrust wherein said empennage is below said wings and the thrust of said propulsion means is directed perpendicular to said wings,
    said aircraft being in the normal flight configuration at the other rotational limit of said empennage and thrust wherein said empennage is behind said wings and the thrust of said propulsion means is directed parallel to said wings, the efflux of said propulsion means being directed over said empennage by said thrust rotating means in all rotational positions of said empennage.

18. An aircraft comprising in combination:
a fuselage having a forward section and a tail section joined together so as to be relatively movable;
wings faired to and radiating from said forward section;
a horizontal stabilizer of lesser span than said wings attached to said tail section;
rudder means associated with said tail section;
propulsion means for said aircraft mounted so as to be movable relative to said forward section of said fuselage in concert with movement of said tail section relative to said forward section, said propulsion means being located to direct its efflux about said horizontal stabilizer and said rudder means whereby control of said aircraft may be effected in all positions of said tail section.

19. The aircraft of claim 18 wherein said rudder means includes two vertical fins, one at each tip of said horizontal stabilizer, within the area of the efflux of the propulsion means such that, as with the horizontal stabilizer, they are completely washed by the efflux.

20. In an aircraft having a fuselage with an empennage and wings which are capable of reduced span for storage, a means to reduce fuselage and empennage length, said means comprising:
an articulation of said empennage to said fuselage; and actuator means between said fuselage and said empennage to cause the latter to move under the former, and
propulsion means having means to provide an efflux that will wash said empennage in all its attitudes relative to said fuselage.

21. The structure of claim 20 and further comprising landing gear means adapted to support said fuselage with empennage in whatever attitude the latter has with the former.

* * * * *